(12) United States Patent
Shi et al.

(10) Patent No.: US 10,945,220 B2
(45) Date of Patent: Mar. 9, 2021

(54) SYSTEM AND METHOD FOR TRANSITION TIME INTERVAL SWITCHING IN AN UPLINK MULTICARRIER SYSTEM

(71) Applicant: TELEFONAKTIEBOLAGET LM ERICSSON (PUBL), Stockholm (SE)

(72) Inventors: Nianshan Shi, Järfälla (SE); Martin Israelsson, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/346,367

(22) PCT Filed: Nov. 1, 2017

(86) PCT No.: PCT/IB2017/056794
§ 371 (c)(1),
(2) Date: Apr. 30, 2019

(87) PCT Pub. No.: WO2018/083609
PCT Pub. Date: May 11, 2018

(65) Prior Publication Data
US 2020/0053664 A1   Feb. 13, 2020

Related U.S. Application Data

(60) Provisional application No. 62/418,062, filed on Nov. 4, 2016.

(51) Int. Cl.
*H04W 52/34* (2009.01)
*H04L 5/00* (2006.01)
*H04W 24/10* (2009.01)
*H04W 52/36* (2009.01)

(52) U.S. Cl.
CPC .......... *H04W 52/34* (2013.01); *H04L 5/0082* (2013.01); *H04W 24/10* (2013.01); *H04W 52/365* (2013.01)

(58) Field of Classification Search
CPC ... H04W 52/34; H04W 24/10; H04W 52/365; H04L 5/0082; H04L 1/0007; H04L 5/0094
See application file for complete search history.

(56) References Cited

U.S. PATENT DOCUMENTS 6,542,736 B1 * 4/2003 Parkvall ................ H04W 28/20
370/465

OTHER PUBLICATIONS

NTT Docomo et al: "PHR for carrier aggregation", 3GPP Draft; R2-103232, 3rd Generation Partnership Project (3GPP), Mobile Competence Centre ; 650, Route Des Lucioles ; F-06921 Sophia-Antipolis Cedex , France, vol. RAN WG2, No. Montreal, Canada; May 10, 2010, May 4, 2010 (May 4, 2010), XP050423308, [retrieved on May 4, 2010] section 2.2; p. 1-p. 2.

(Continued)

*Primary Examiner* — Vinncelas Louis

(57) ABSTRACT

A system and method to perform fast transition time interval switching in an uplink multicarrier system. In one embodiment, an apparatus, and related method, is configured to receive a first user equipment power headroom ("UPH") filtering value for a first uplink carrier from a user equipment, identify a measurement identifier with a first value for the first uplink carrier, and transmit the first UPH filtering value and the measurement identifier with the first value to a radio network controller.

20 Claims, 8 Drawing Sheets

(56) References Cited

OTHER PUBLICATIONS

Huawei: "Introduction of enhanced TTI switching", 3GPP Draft; R3-162393, 3rd Generation Partnership Project . (3GPP), Mobilecompetence Centre , 650, Route Des Lucio Les • F-06921 Sophia-Antipolis Cedex ' France ol. RAN WG2, no. Sophia Antipolis, France; Oct. 10, 2016-Oct. 14, 2016 Oct. 6, 2016 (Oct. 6, 20160, XP051152044, Retrieved from the Internet.

Nortel Networks: "RNC Initiated RAB Reconfiguration during active session", 3GPP Draft; R3-003121, 3rd Generation Partnership Project (3GPP), Mobile Competence Centre ; 650, Route Des Lucioles ; F-06921 Sophia-Antipolis Cedex , France, vol. RAN WG3, No. Chicago, USA; Nov. 16, 2000, Nov. 16, 2000 (Nov. 16, 2000), XP050148597, [retrieved on Nov. 16, 2000] section 7.2.2.1.1; p. 5.

* cited by examiner

SYSTEM AND METHOD FOR TRANSITION TIME INTERVAL SWITCHING IN AN UPLINK MULTICARRIER SYSTEM

This application is a 371 of International Application No. PCT/IB2017/056794, filed Nov. 1, 2017, which claims the benefit of U.S. Provisional Application No. 62/418,062, filed Nov. 4, 2016, the disclosures of which are fully incorporated herein by reference.

TECHNICAL FIELD

The present invention is directed, in general, to the communication systems and, more specifically, to a system and method for transition time interval switching in an uplink multicarrier system.

BACKGROUND

In Release 12, an enhanced uplink ("EUL") work item in the Third Generation Partnership Program ("3GPP") introduced fast transmission time interval ("TTI") switching for a single EUL carrier. For uplink multicarrier systems (prior to Release 14), the Universal Mobile Telecommunications System ("UMTS") standard only allowed a TTI equal to 2 milliseconds ("ms") on both uplink EUL carriers for dual band/dual carrier-high speed uplink packet access ("DB/DC-HSUPA"). Thus, there is no provision for TTI switching for uplink multicarrier systems.

SUMMARY

These and other problems are generally solved or circumvented, and technical advantages are generally achieved, by advantageous embodiments of the present invention for a system and method to perform fast transition time interval switching in an uplink multicarrier system. In one embodiment, an apparatus, and related method, is configured to receive a first user equipment power headroom ("UPH") filtering value for a first uplink carrier from a user equipment, identify a measurement identifier with a first value for the first uplink carrier, and transmit the first UPH filtering value and the measurement identifier with the first value to a radio network controller.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules to report user equipment power headroom ("UPH") filtering values from a base station to a controlling core network element such as a radio network controller ("RNC") to support fast transition time interval ("TTI") switching in an uplink multicarrier system. While the principles will be described in the environment of a 3GPP Long Term Evolution ("LTE") or a New Radio ("NR") communication system, any environment such as a Wi-Fi wireless communication system is well within the broad scope of the present disclosure.

Figure 1:
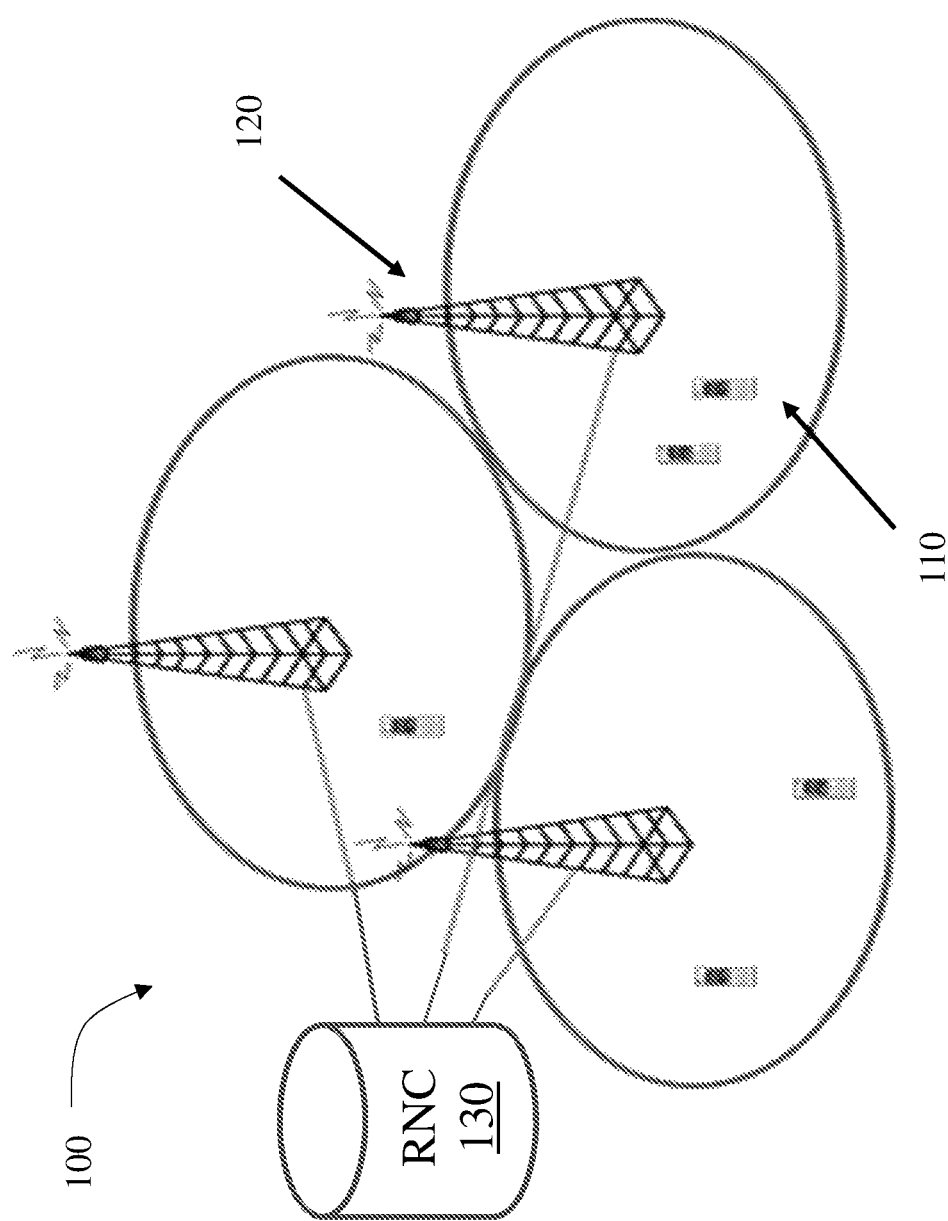
FIGS. 1 to 3 illustrate diagrams of embodiments of a communication system, and portions thereof.
Figure 2:
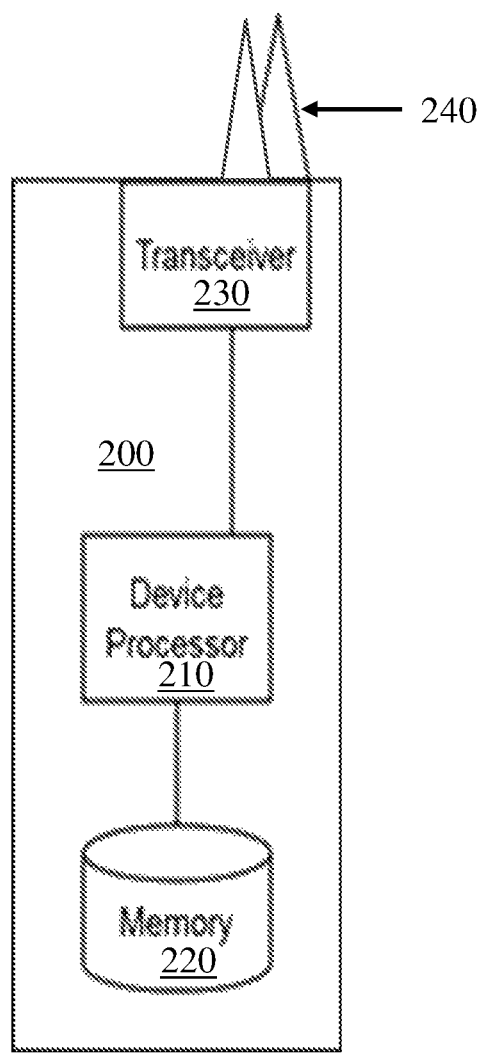
Figure 3:
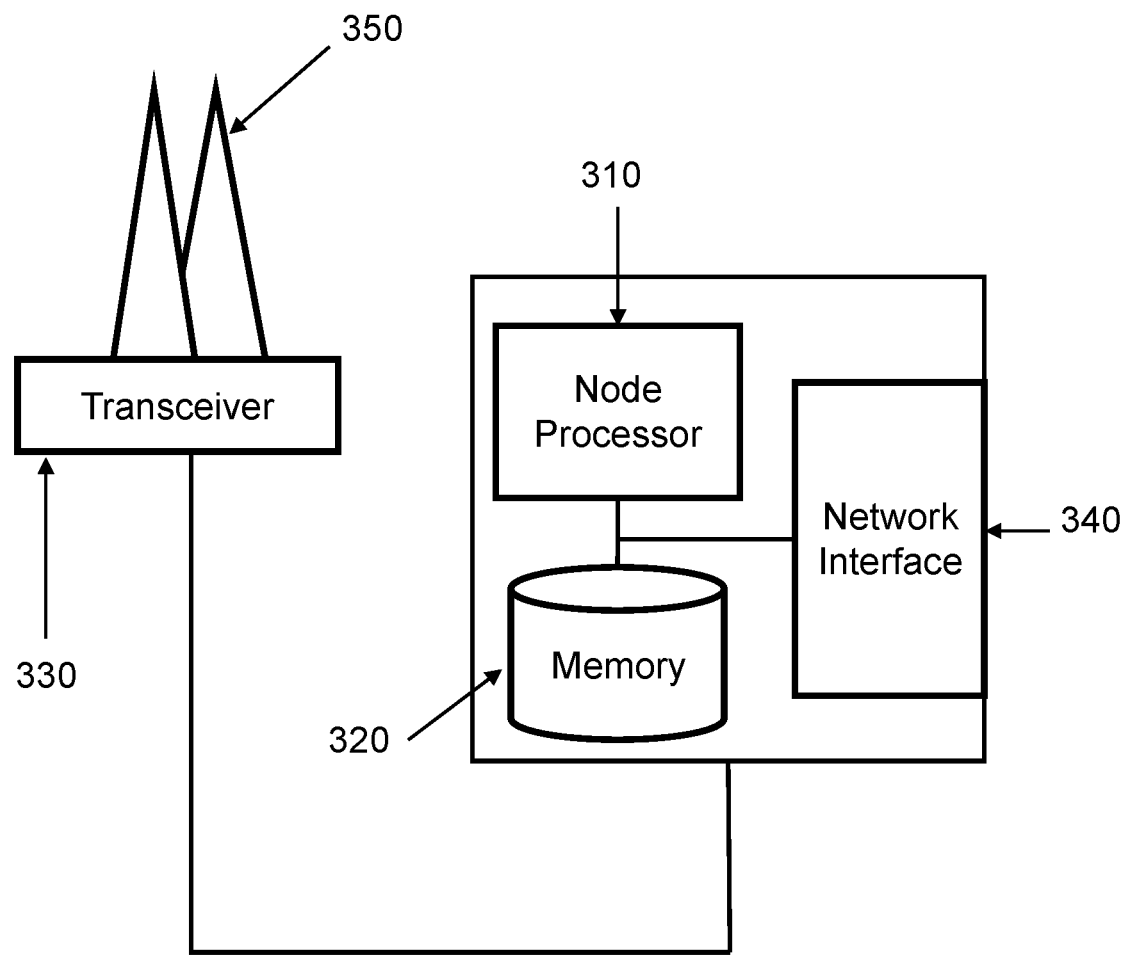

Referring initially to FIGS. 1 to 3, illustrated are diagrams of embodiments of a communication system 100, and portions thereof. As shown in FIG. 1, the communication system 100 includes one or more instances of wireless communication devices (one of which is designated 110, and also referred to as user equipment ("UE")).

The wireless communication device 110 may be any device that has an addressable interface (e.g., an Internet protocol ("IP") address, a Bluetooth identifier ("ID"), a near-field communication ("NFC") ID, etc.) and/or is intended for accessing services via an access network and configured to communicate over the access network via the addressable interface. For instance, the wireless communication device 110 may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The wireless communication device 110 may be a portable, pocket-storable, hand-held, computer-comprised, or vehicle-mounted mobile device, enabled to communicate voice and/or data, via a wireless or wireline connection. A wireless communication device 110 may have functionality for performing monitoring, controlling, measuring, recording, etc., that can be embedded in and/or controlled/monitored by a central processing unit ("CPU"), microprocessor, ASIC, or the like, and configured for connection to a network such as a local ad-hoc network or the Internet. A wireless communication device 110 may have a passive communication interface, such as a quick response (Q) code, a radio-frequency identification ("RFID") tag, an NFC tag, or the like, or an active communication interface, such as a modem, a transceiver, a transmitter-receiver, or the like.

The communication system also includes one or more radio access nodes (one of which is designated 120) such as Node Bs, eNode Bs, gNBs (NextGen radio access network nodes) or other base stations capable of communicating with the wireless communication devices 110 along with any additional elements suitable to support communication between wireless communication devices 110 or between a wireless communication device 110 and another communication device (such as a landline telephone). The communication system also includes a radio network controller ("RNC") 130 in communication with the radio access node 120.

Although the illustrated wireless communication devices 110 may represent communication devices that include any suitable combination of hardware and/or software, the wireless communication devices 110 may, in particular embodiments, represent devices such as the example wireless communication device 200 illustrated in greater detail by FIG. 2. Similarly, although the illustrated radio access node 120 may represent network nodes that include any suitable combination of hardware and/or software, these nodes may, in particular embodiments, represent devices such as the example radio access node 300 illustrated in greater detail by FIG. 3. Additionally, the RNC 130 may include analogous elements to the radio access node 120 illustrated in FIG. 3.

As shown in FIG. 2, the example wireless communication device includes a processor (or processing circuitry) 210, a memory 220, a transceiver 230, and antennas 240. In particular embodiments, some or all of the functionality described above as being provided by machine type communication ("MTC") and machine-to-machine ("M2M") devices, and/or any other types of wireless communication devices may be provided by the device processor executing instructions stored on a computer-readable medium, such as the memory shown in FIG. 2. Alternative embodiments of the wireless communication device may include additional components beyond those shown in FIG. 2 that may be responsible for providing certain aspects of the device's functionality, including any of the functionality described above and/or any functionality necessary to support the solution described herein.

As shown in FIG. 3, the example radio access node includes a processor (or processing circuitry) 310, a memory 320, a transceiver 330, a network interface 340 and antennas 350. In particular embodiments, some or all of the functionality described herein may be provided by a base station, a node B, an enhanced node B, a base station controller, a radio network controller, a relay station and/or any other type of network node may be provided by the node processor executing instructions stored on a computer-readable medium, such as the memory shown in FIG. 3. Alternative embodiments of the radio access node may include additional components responsible for providing additional functionality, including any of the functionality identified above and/or any functionality necessary to support the solution described herein.

The processors, which may be implemented with one or a plurality of processing devices, performs functions associated with its operation including, without limitation, precoding of antenna gain/phase parameters, encoding and decoding of individual bits forming a communication message, formatting of information and overall control of a respective communication device. Exemplary functions related to management of communication resources include, without limitation, hardware installation, traffic management, performance data analysis, configuration management, security, billing and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof The transceivers modulate information onto a carrier waveform for transmission by the respective communication device via the respective antenna(s) to another communication device. The respective transceiver demodulates information received via the antenna(s) for further processing by other communication devices. The transceiver is capable of supporting duplex operation for the respective communication device. The network interface performs similar functions as the transceiver communicating with a core network.

Prior to the 3GPP Release 14, the fast TTI switching was only supported when single uplink enhanced-dedicated channel ("E-DCH") carrier was configured. The UPH filtering value, received from a UE, was forwarded from a Node B to an RNC in a "RADIO LINK PARAMETER UPDATE INDICATION" so that the RNC could determine the target TTI switching configuration. One high-speed shared control channel ("HS-SCCH") order was used to change the TTI configuration from 10 ms TTI to 2 ms TTI, or from 2 ms TTI to 10 ms TTI.

The Release 14 work item, "Multicarrier Enhancements for UMTS," introduces different TTI configurations per carrier for DB/DC-HSUPA. In addition to the existing 2 ms TTI+2 ms TTI configuration, now the standard supports 2 ms TTI+10 ms TTI, 10 ms TTI+10 ms TTI, and 10 ms TTI+2 ms TTI, wherein the first TTI value is for the primary uplink carrier and the second TTI value is for the secondary uplink carrier. It is also contemplated that the Release 12 fast TTI switching should be supported in uplink multicarrier systems.

In the Release 14 uplink multicarrier enhancement feature, the UE may report the UPH filtering value for the primary and the secondary uplink carriers separately. Four high-speed shared control channel ("HS-SCCH") orders are available to change the source TTI switching configurations to a defined target TTI switching configuration (e.g., 2 ms TTI+2 ms TTI, 2 ms TTI+10 ms TTI, 10 ms TTI+10 ms TTI, 10 ms TTI+2 ms TTI).

The current 3GPP standard only supports the fast TTI switching for a single uplink carrier. In other words, when single EUL carrier is configured, a switch from 2 ms TTI to 10 ms TTI, or vice versa, is available. A user equipment power headroom ("UPH") filtering value can be forwarded from a base station (a Node B) to a radio network controller ("RNC"), so that RNC can determine to make a TTI switching decision. The UPH filtering value may be received from the user equipment ("UE") in uplink media access control ("MAC") control information ("MCI"). In an uplink multicarrier system, more than one uplink carrier is supported. While the UPH filtering value may be reported by the UE for each uplink carrier, the mechanism to perform the reporting from the Node B to the RNC is to be determined.

In order to help the RNC determine the target TTI switching configurations for the fast TTI switching, the Node B can provide the UPH filtering values for the primary carrier and the secondary carrier. The Node B can forward a UPH filtering value for one uplink carrier (e.g., one uplink E-DCH carrier) in a message from the Node B to the RNC. The Node B can also forward a UPH filtering value for multiple uplink carriers (e.g., multiple uplink E-DCH carriers) in a message from the Node B to the RNC. Additionally, the Node B can propose a target TTI switching configuration to the RNC based on a UPH filtering value for at least one uplink carrier (e.g., at least one uplink E-DCH carrier) from the UE. For further clarification of TTI switching configurations, see U.S. Patent Application Publication No. 2015/0289243 entitled "TTI Switching," by Shi, et al., published Oct. 8, 2015, which is incorporated herein by reference.

Figure 4:
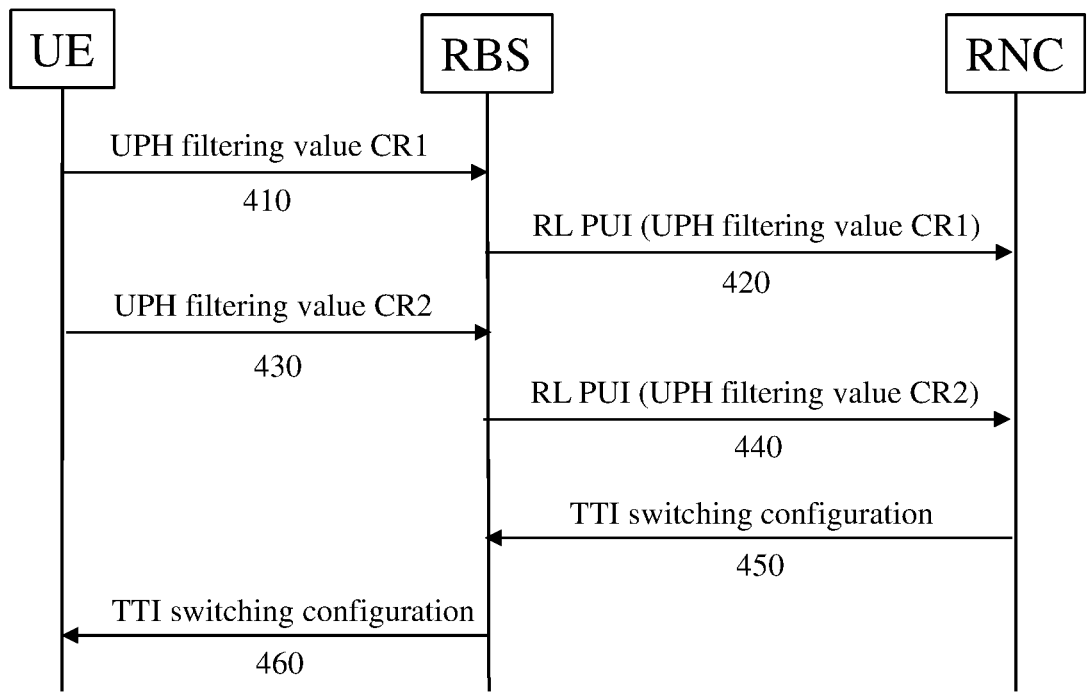
FIGS. 4 to 6 illustrate signaling diagrams of embodiments of methods of operating a communication system.

Turning now to FIG. 4, illustrated is a signaling diagram of embodiment of a method of operating a communication system. The communication system includes a user equipment ("UE"), radio base station ("RBS," also an Node B) and a radio network controller ("RNC"). The UE provides a UPH filtering value for an uplink carrier (designated "CR1") to the RBS at a step or module 410, which forwards the value in a radio link parameter update indication ("RL PUT") to the RNC at a step or module 420. Additionally, the UE provides a UPH filtering value for another uplink carrier (designated "CR2") to the RBS at a step or module 430, which forwards the value in a radio link parameter update indication ("RL PUT") to the RNC at a step or module 440. The RNC thereafter can determine and provide a TTI switching configuration as a function of the UPH filtering values to the RBS at a step or module 450, which forwards the TTI switching configuration to the UE at a step or module 460.

In one embodiment, a method operable with a base station (RBS, 120) in a communication system (100) having a first uplink carrier and a second uplink carrier includes receiving a first UPH filtering value (CR1) for the first uplink carrier from a user equipment (UE, 110), and transmitting the first UPH filtering value (CR1) to a radio network controller (RNC, 130). The base station (RBS, 120) also receives a second UPH filtering value (CR2) for the second uplink carrier from the user equipment (UE, 110), and transmits the second UPH filtering value (CR2) to the radio network controller (RNC, 130). The base station (RBS, 120) also receives a transmission time interval (TTI) switching configuration as a function of the first UPH filtering value (CR1) and the second UPH filtering value (CR2) from the radio network controller (RNC, 130).

Thus, the UE measurement is forwarded in the radio link parameter update indication. The UPH filtering value is forwarded from the RBS to RNC. In uplink multicarrier systems, the radio link parameter update indication can specify an uplink carrier such as a primary or secondary carrier. In the present UE measurement forwarding and UE measurement value (in TS 25.433 (v.13.3.0), which is incorporated herein by reference), a measurement identifier ("ID") is available. For the UPH filtering value, however, the measurement ID is not used, as five bits are used to convey the UPH filtering value. Thus, the UE cannot report the measurement ID in the MCI.

As specified herein, the existing measurement ID can be defined to identify the reports for the different carriers. For example, a semantic description in a measurement ID information element ("IE") in UE measurement forwarding can specify reporting the "UPH Filtering Value" for uplink multi-carrier: Measurement ID 1 indicates a primary uplink carrier; and Measurement ID 2 indicates a secondary uplink carrier. (See Table 1 below.)

Chapter 9.2.2.207 UE Measurement Forwarding in TS 25.433 (v13.3.0)

TABLE 1

An example to define Measurement ID in a semantic description to specify a carrier associated with a forwarded measurement.

| IE/Group Name | Presence | Range | IE Type and Reference | Semantics Description |
|---|---|---|---|---|
| Measurement ID | M | | 9.2.1.42 | When reporting the "UPH Filtering Value" for uplink multi-carrier: Measurement ID 1 indicates Primary UL carrier; Measurement ID 2 indicates the Secondary UL carrier. |
| UE Measurement Value | M | | 9.2.2.208 | |

Another example is to add the semantic description as described in Table2 below.

Chapter 9.2.2.208 UE Measurement Value in TS 25.433 (v13.3.0)

TABLE 2

An example to define Measurement ID in a semantic description to specify a carrier associated with a forwarded measurement.

| IE/Group Name | Presence | Range | IE Type and Reference | Semantics Description |
|---|---|---|---|---|
| CHOICE Dedicated Measurement Value | M | | | |
| >UPH Filtering Value | | | | |

TABLE 2-continued

An example to define Measurement ID in a semantic description to specify a carrier associated with a forwarded measurement.

| IE/Group Name | Presence | Range | IE Type and Reference | Semantics Description |
|---|---|---|---|---|
| >>UPH Filtering Value | M | | INTEGER (0 . . . 32) | According to mapping in TS 25.321 [32], which is incorporated herein by reference. When reporting the "UPH Filtering Value" for uplink multi-carrier: Measurement ID 1 indicates Primary UL carrier; Measurement ID 2 indicates the Secondary UL carrier. |

Instead of modifying the semantic description, another approach is to modify the procedure text, for example, to add "when reporting the "UPH Filtering Value" for uplink multi-carrier: Measurement ID 1 indicates primary uplink carrier; Measurement ID 2 indicates the secondary uplink carrier.

In yet another approach, in lieu of modifying the existing measurement ID, an identifier for the E-DCH can be added, for instance, to introduce an E-DCH Additional RL ID in the UE measurement forwarding or in the measurement value IE. (See Table 3.) Of course, a similar approach to associate the measurement and the carrier may be introduced to other IE groups.

Chapter 9.2.2.207 UE Measurement Forwarding in TS 25.433 (v13.3.0)

TABLE 3

An example to add a new identifier (e.g., RL ID) to specify the forwarded measurement associated with a carrier/radio link ("RL").

| IE/Group Name | Presence | Range | IE Type and Reference | Semantics Description |
|---|---|---|---|---|
| Measurement ID | M | | 9.2.1.42 | |
| UE Measurement Value | M | | 9.2.2.208 | |

TABLE 3-continued

An example to add a new identifier (e.g., RL ID) to specify the forwarded measurement associated with a carrier/radio link ("RL").

| IE/Group Name | Presence | Range | IE Type and Reference | Semantics Description |
|---|---|---|---|---|
| E-DCH RL ID | O | | RL ID 9.2.1.53 | |

Figure 5:
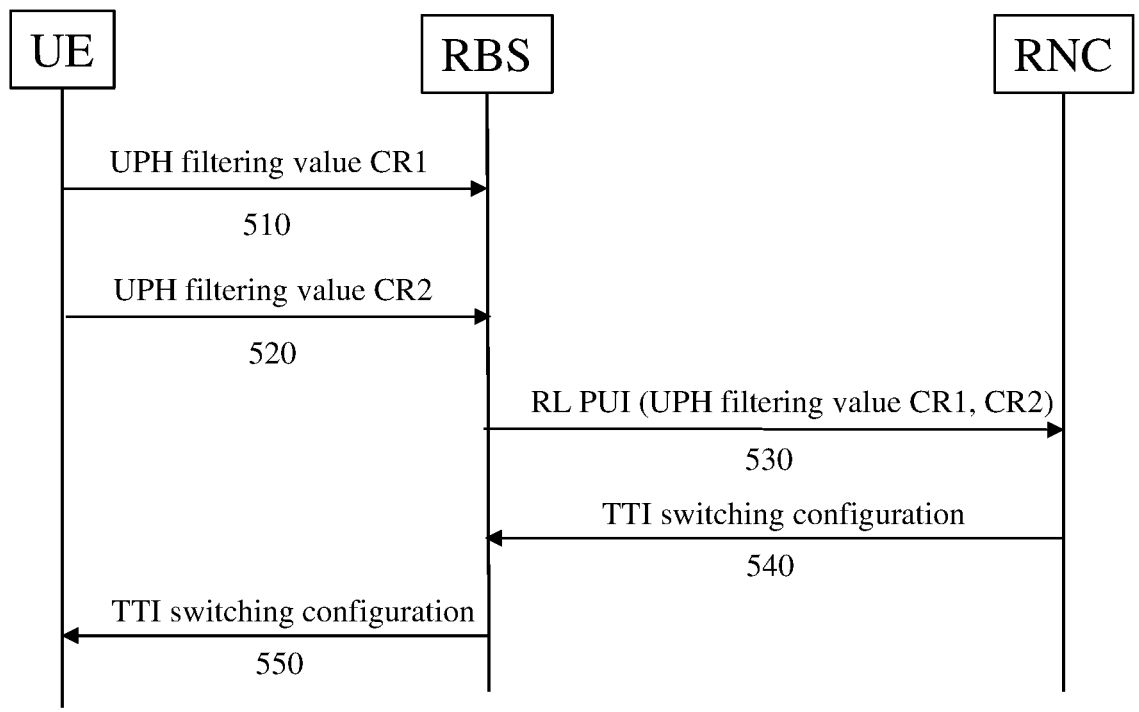

Turning now to FIG. 5, illustrated is a signaling diagram of embodiment of a method of operating a communication system. The communication system includes a user equipment ("UE"), radio base station ("RBS," also a Node B) and a radio network controller ("RNC"). The UE provides a UPH filtering value for an uplink carrier (designated "CR1") to the RBS at a step or module 510 and a UPH filtering value for another uplink carrier (designated "CR2") to the RBS at a step or module 520. The RBS then forwards the values in a radio link parameter update indication ("RL PUI") to the RNC at a step or module 530. (See Table 4.) The RNC thereafter can provide a TTI switching configuration as a function of the UPH filtering values to the RBS at a step or module 540, which forwards the TTI switching configuration to the UE at a step or module 550.

Chapter 9.2.2.138 Additional E-DCH FDD Update Information in TS 25.433 (v13.3.0)

TABLE 4

An example to allow UE measurement forwarding in secondary uplink carrier for E-DCH frequency division duplex ("FDD") Update Information.

| IE/Group Name | Presence | Range | IE Type and Reference | Semantics Description |
|---|---|---|---|---|
| HARQ Process Allocation For 2 ms Scheduled Transmission Grant | O | | HARQ Process Allocation for 2 ms TTI 9.2.2.13Dn | |
| Additional E-DCH DL Control Channel Change Information | | 0..<maxnoofEDCHRLs> | | |
| >E-DCH Additional RL ID | M | | RL ID 9.2.1.53 | |
| UE Measurement Forwarding | O | | 9.2.2.207 | |

In one embodiment, a method operable with a base station (RBS, 120) in a communication system (100) having a first uplink carrier and a second uplink carrier includes receiving a first UPH filtering value (CR1) for the first uplink carrier from a user equipment (UE, 110), and receiving a second UPH filtering value (CR2) for the second uplink carrier from the user equipment (UE, 110). The base station (RBS, 120) then transmits the first UPH filtering value (CR1) and the second UPH filtering value (CR2) to the radio network controller (RNC, 130). The base station (RBS, 120) also receives a transmission time interval (TTI) switching configuration as a function of the first UPH filtering value (CR1) and the second UPH filtering value (CR2) from the radio network controller (RNC, 130).

Figure 6:
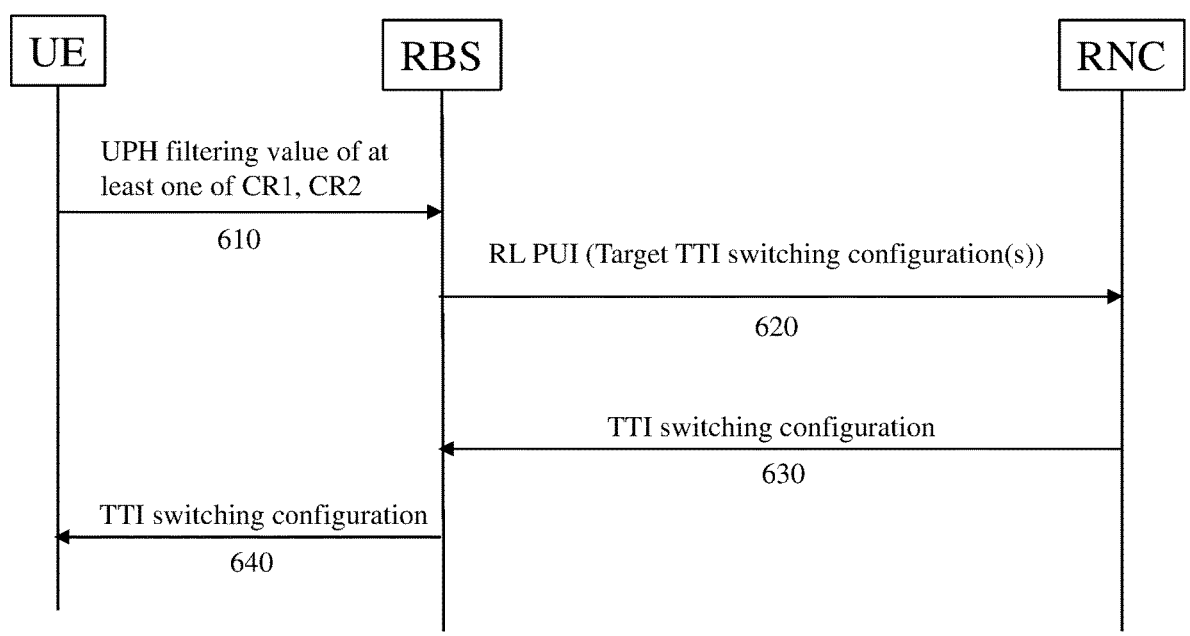

Turning now to FIG. 6, illustrated is a signaling diagram of embodiment of a method of operating a communication system. The communication system includes a user equipment ("UE"), radio base station ("RBS," also a Node B) and a radio network controller ("RNC"). The UE provides a UPH filtering value for at least one of an uplink carrier (designated "CR1") and another uplink carrier (designated "CR2") to the RBS at a step or module 610. The RBS then provides a target TTI switching configuration(s) in a radio link parameter update indication ("RL PUT") to the RNC at a step or module 620. The RNC thereafter can provide a TTI switching configuration based on the target TTI switching configuration(s) to the RBS at a step or module 630, which forwards the TTI switching configuration to the UE at a step or module 640.

Instead of forwarding the UPH filtering values, the RBS processes the received UPH filtering value(s) from the UE (in, for instance, the MCI) and proposes one or more suggestions for the target TTI switching configuration(s). The RNC can then determine based on the recommendations and other factors the TTI switching configuration.

In one embodiment, a method operable with a base station (RBS, 120) in a communication system (100) having a first uplink carrier and a second uplink carrier includes receiving at least one of a first UPH filtering value (CR1) for the first uplink carrier and a second UPH filtering value (CR2) for the second uplink carrier from the user equipment (UE, 110). The base station (RBS, 120) also determines a target transmission time interval switching configuration as a function of the at least one of the first UPH filtering value (CR1) and the second UPH filtering value (CR2), and transmits the target transmission time interval switching configuration to a radio network controller (RNC, 130). The base station (RBS, 120) also receives a transmission time interval (TTI) switching configuration as a function of the target transmission time interval switching configuration from the radio network controller (RNC, 130).

As indicated herein, the UPH filtering value can be sent in the MCI on either or both of the primary and secondary carriers, which assists with the TTI switching configuration for that carrier. A HS-SCCH order can change the source TTIs configuration to a defined target TTI configuration. The underlined entries in Table 5 indicate additional HS-SCCH orders and the target TTI configuration.

TABLE 5

HS-SCCH orders and the target TTI configuration

| Extended Order Type $X_{eodt,1}, X_{eodt,2}$ | Order Type $X_{odt,1}, X_{odt,2}, X_{odt,3}$ | Order Mapping $X_{ord,1}$ | $X_{ord,2}$ | $X_{ord,3}$ | Interpretation |
|---|---|---|---|---|---|
| 11 | 011 | 0 | 0 | 0 | Unused (Reserved dual cell E-DCH) |
|  |  | 0 | 0 | 1 | Unused (Reserved dual cell E-DCH) |
|  |  | <u>0</u> | <u>1</u> | <u>0</u> | TTI switch order to 2 ms + 2 ms |
|  |  | <u>0</u> | <u>1</u> | <u>1</u> | TTI switch order to 2 ms + 10 ms |
|  |  | <u>1</u> | <u>0</u> | <u>0</u> | TTI switch order to 10 ms + 2 ms |
|  |  | <u>1</u> | <u>0</u> | <u>1</u> | TTI switch order to 10 ms + 10 ms |
|  |  | 1 | 1 | 0 | Unused (Reserved dual cell E-DCH) |
|  |  | 1 | 1 | 1 | Unused (Reserved dual cell E-DCH) |

The RNC may employ the UPH filtering value to make the TTI switching decision. While Release 12 used the UE measurement reporting mechanism, the fast TTI switching is for single E-DCH carrier. Thus, at any given time, only one UPH filtering value is sent from the eNode B to RNC in a Radio Link Parameter Update message. As described above, the UPH filtering values can be sent in a single message or in two concurrent messages via the Radio Link Parameter Update message.

For UE measurement forwarding, the measurement ID is not reported in the UPH filtering value (five bits). When reporting the UPH filtering value for uplink multi-carrier communication systems, a semantic description may include Measurement ID 1 indicates a primary UL carrier and Measurement ID 2 indicates a secondary UL carrier.

Figure 7:
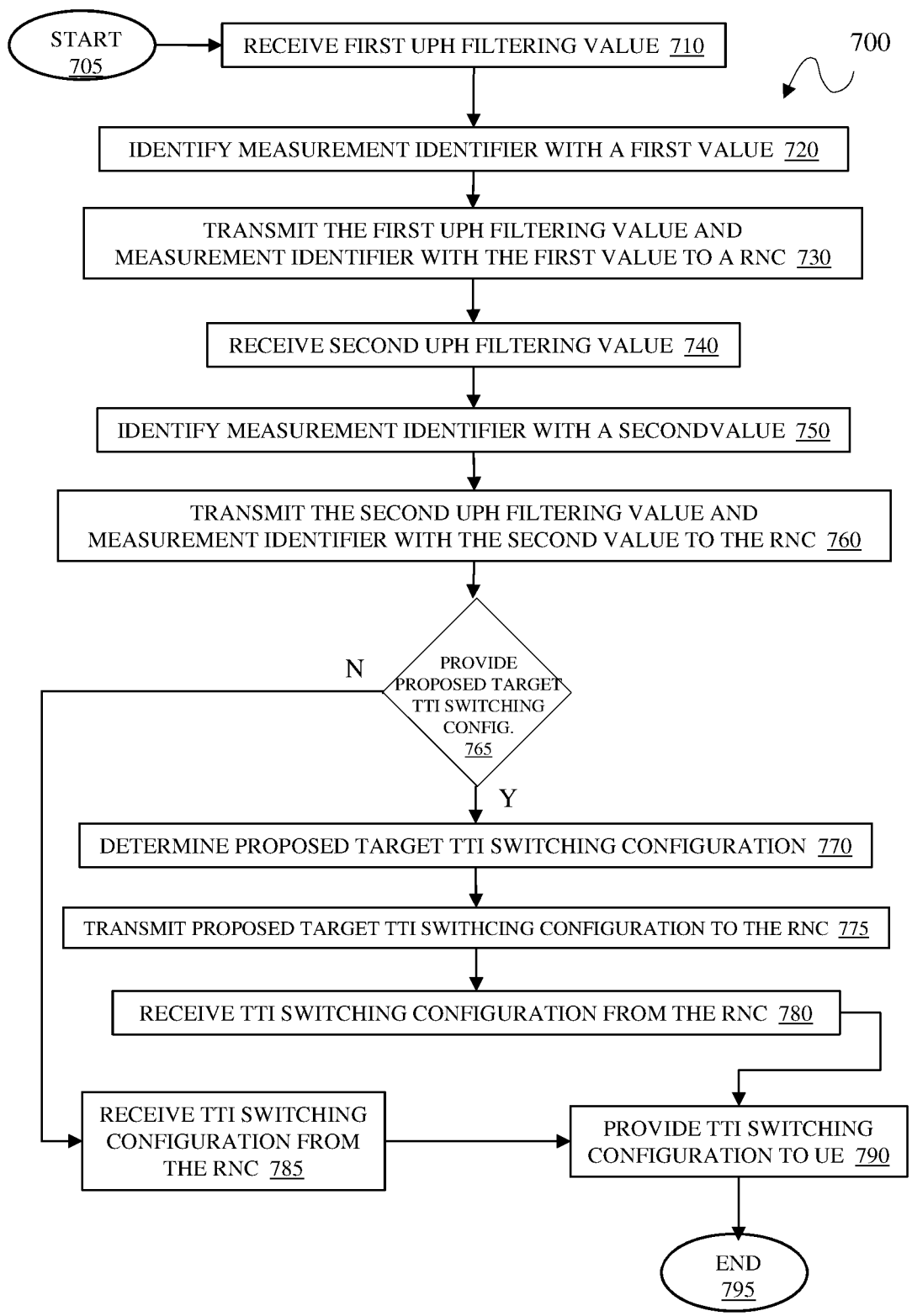
FIGS. 7 and 8 illustrate flow diagrams of embodiments of methods of operating a communication system.

Turning now to FIG. 7, illustrated is a flow diagram of an embodiment of a method 700 of operating a communication system (100). In addition to the method steps, the discussion of the method 700 that follows will identify example elements (in parentheses) from preceding FIGUREs. The method 700 will be described from a perspective of a radio access node (RBS, 120, 300) in a communication system (100) having a first uplink carrier (e.g., a primary uplink carrier) and a second uplink carrier (e.g., a secondary uplink carrier) and begins at a start step or module 705. At a step or module 710, the radio access node (RBS, 120, 300) receives a first user equipment power headroom ("UPH") filtering value for the first uplink carrier as part of, for instance, media access control ("MAC") control information ("MCI") from a user equipment (UE, 110, 200). At a step or module 720, the radio access node (RBS, 120, 300) identifies a measurement identifier with a first value (CR1) for the first uplink carrier, and transmits the first UPH filtering value and the measurement identifier with said first value (CR1) as part of, for instance, a radio link parameter update indication ("RL PUI") to a radio network controller (RNC, 130) at a step or module 730.

At a step or module 740, the radio access node (RBS, 120, 300) receives a second UPH filtering value for the second uplink carrier as part of, for instance, media access control ("MAC") control information ("MCI") from a user equipment (UE, 110, 200). At a step or module 750, the radio access node (RBS, 120, 300) identifies a measurement identifier with a second value (CR2) for the second uplink carrier, and transmits the second UPH filtering value and the measurement identifier with said second value (CR2) as part of, for instance, a radio link parameter update indication ("RL PUI") to the radio network controller (RNC, 130) at a step or module 760. For example, the measurement identifier with the first value (CR1) may have a value of one (designated "Measurement ID 1") and the measurement identifier with the second value (CR2) may have a value of two (designated "Measurement ID2").

At a decisional step or module 765, the method 700 determines if the radio access node (RBS, 120, 300) will provide a proposed target transmission time interval switching configuration. If the radio access node (RBS, 120, 300) will provide the proposed target transmission time interval switching configuration, the method 700 continues to a step of module 770, otherwise the method transitions to a step or module 785.

At the step or module 770, the radio access node (RBS, 120, 300) determines a proposed target transmission time interval switching configuration as a function of the first UPH filtering value and/or the second UPH filtering value, and transmits the proposed target transmission time interval switching configuration to the radio network controller (RNC, 130) at a step or module 775. The radio access node (RBS, 120, 300) then receives a transmission time interval switching configuration as a function of the proposed target transmission time interval switching configuration from the radio network controller (RNC, 130). In addition to the target transmission time interval switching configuration, the radio network controller (RNC, 130) also takes into account the first UPH filtering value and/or the second UPH filtering value to determine the transmission time interval switching configuration. At the step or module 790, the radio access node (RBS, 120, 300) provides the transmission time interval switching configuration to the user equipment (UE, 110, 200), and the method ends at a step or module 795.

At the step or module 785, the radio access node (RBS, 120, 300) receives a transmission time interval switching configuration as a function of the first UPH filtering value and/or the second UPH filtering value from the radio network controller (RNC, 130). At the step or module 790, the radio access node (RBS, 120, 300) provides the transmission time interval switching configuration to the user equipment (UE, 110, 200), and the method ends at a step or module 795.

Figure 8:
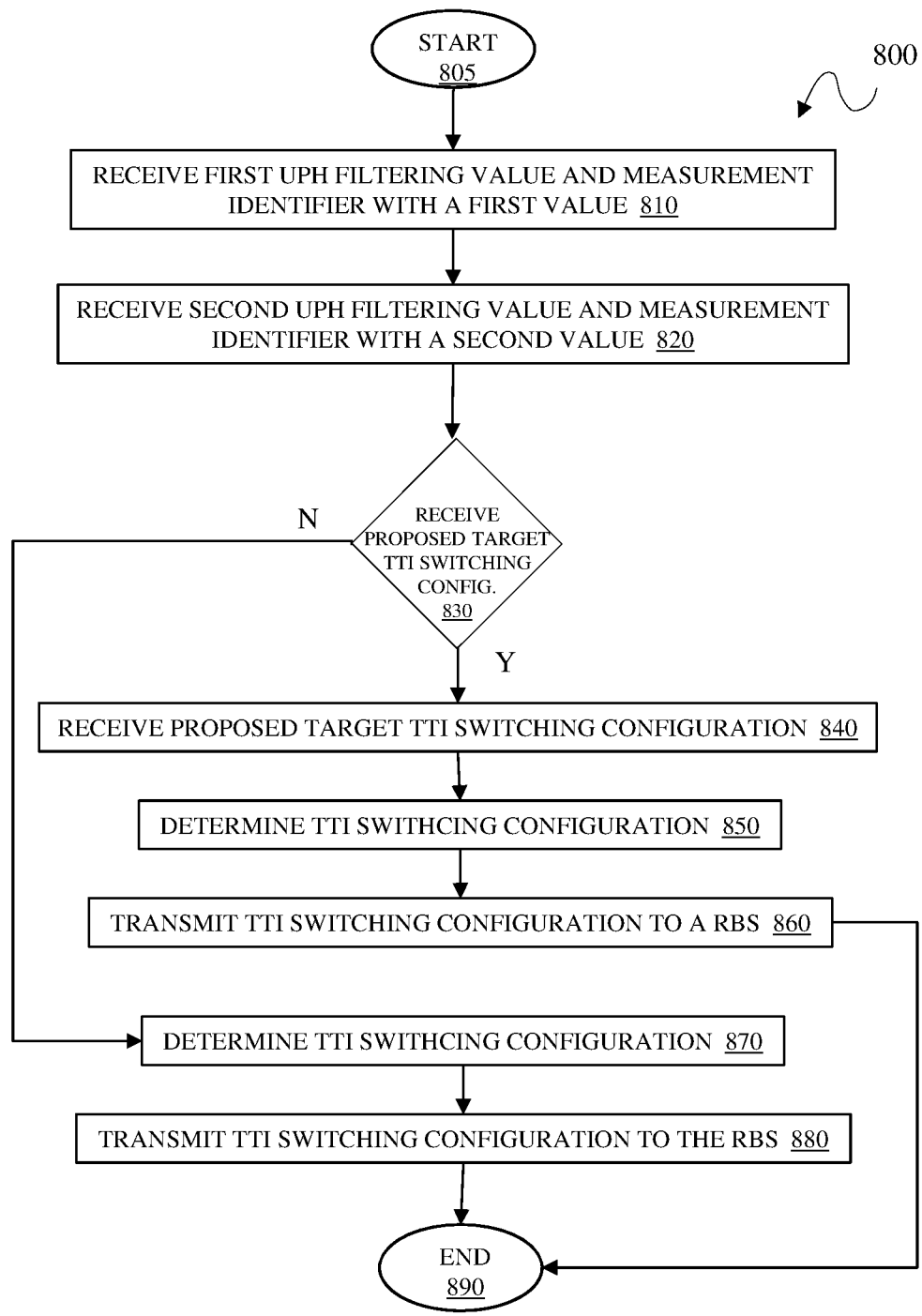

Turning now to FIG. 8, illustrated is a flow diagram of an embodiment of a method 800 of operating a communication system (100). In addition to the method steps, the discussion of the method 800 that follows will identify example elements (in parentheses) from preceding FIGUREs. The method 800 will be described from a perspective of a radio network controller (RNC, 130, 300) in a communication system (100) having a first uplink carrier (e.g., a primary uplink carrier) and a second uplink carrier (e.g., a secondary uplink carrier) and begins at a start step or module 805. At a step or module 810, the radio network controller (RNC, 130, 300) receives a first user equipment power headroom ("UPH") filtering value and a measurement identifier with a first value (CR1) for the first uplink carrier as part of, for instance, a radio link parameter update indication ("RL PUI") from a radio access node (RBS, 120). At a step or module 820, the radio network controller (RNC, 130, 300) receives a second UPH filtering value and the measurement identifier with a second value (CR2) for the second uplink carrier as part of, for instance, a radio link parameter update indication ("RL PUI") from the radio access node (RBS, 120). For example, the measurement identifier with the first value (CR1) may have a value of one (designated "Measurement ID1") and the measurement identifier with the second value (CR2) may have a value of two (designated "Measurement ID2").

At a decisional step or module 830, the method 800 determines if the radio network controller (RNC, 130, 300) will receive a proposed target transmission time interval switching configuration. If the radio network controller (RNC, 130, 300) will receive a proposed target transmission time interval switching configuration, the method 800 continues to a step of module 840, otherwise the method transitions to a step or module 870.

At the step or module 840, the radio network controller (RNC, 130, 300) receives the proposed target transmission time interval switching configuration as a function of said first UPH filtering value and/or said second UPH filtering value from said radio access node (RBS, 120). The radio network controller (RNC, 130, 300) then determines a transmission time interval switching configuration as a function of the proposed target transmission time interval switching configuration at a step or module 850. In addition to the target transmission time interval switching configuration, the radio network controller (RNC, 130) also takes into account the first UPH filtering value and/or the second UPH filtering value to determine the transmission time interval switching configuration. At a step or module 860, the radio network controller (RNC, 130, 300) transmits the transmission time interval switching configuration to the radio access node (RBS, 120, 300), and the method ends at a step or module 890.

At the step or module 870, the radio network controller (RNC, 130, 300) determines a transmission time interval switching configuration as a function of the first UPH filtering value and/or the second UPH filtering value. At the step or module 880, the radio network controller (RNC, 130, 300) transmits the transmission time interval switching configuration to the radio access node (RBS, 120, 300), and the method ends at the step or module 890.

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A method operable with a radio access node in a communication system having a first uplink carrier and a second uplink carrier, comprising:
   receiving a first user equipment power headroom (UPH) filtering value for said first uplink carrier from a user equipment (UE);
   identifying a measurement identifier with a first value for said first uplink carrier;
   transmitting said first UPH filtering value and said measurement identifier with said first value to a radio network controller (RNC);
   receiving a second UPH filtering value for said second uplink carrier from said user equipment;
   identifying said measurement identifier with a second value for said second uplink carrier; and
   transmitting said second UPH filtering value and said measurement identifier with said second value to said radio network controller.

2. The method as recited in claim 1 wherein transmitting said second UPH filtering value and said measurement identifier with said second value is part of a radio link parameter update indication (RL PUI) to said radio network controller.

3. The method as recited in claim 1 further comprising receiving a transmission time interval switching configuration as a function of said first UPH filtering value and said second UPH filtering value from said radio network controller.

4. The method as recited in claim 1, further comprising:
   determining a proposed target transmission time interval switching configuration as a function of said first UPH filtering value; and
   transmitting said proposed target transmission time interval switching configuration to said radio network controller.

5. An apparatus operable in a communication system having a first uplink carrier and a second uplink carrier, comprising:
   processing circuitry, configured to:
   receive a first user equipment power headroom (UPH) filtering value for said first uplink carrier from a user equipment (UE);
   identify a measurement identifier with a first value for said first uplink carrier;
   transmit said first UPH filtering value and said measurement identifier with said first value to a radio network controller (RNC);
   receive a second UPH filtering value for said second uplink carrier from said user equipment;
   identify said measurement identifier with a second value for said second uplink carrier; and
   transmit said second UPH filtering value and said measurement identifier with said second value to said radio network controller.

6. The apparatus as recited in claim 5 wherein said processing circuitry is configured to transmit said second UPH filtering value and said measurement identifier with said second value as part of a radio link parameter update indication (RL PUI) to said radio network controller.

7. The apparatus as recited in claim 5 wherein said processing circuitry is configured to receive a transmission time interval switching configuration as a function of said first UPH filtering value and said second UPH filtering value from said radio network controller.

8. The apparatus as recited in claim 5 wherein said processing circuitry is configured to:
   determine a proposed target transmission time interval switching configuration as a function of said first UPH filtering value; and
   transmit said proposed target transmission time interval switching configuration to said radio network controller.

9. A method operable with a network controller in a communication system having a first uplink carrier and a second uplink carrier, comprising:
   receiving a first user equipment power headroom filtering value and a measurement identifier with a first value for said first uplink carrier from a radio access node; and
   receiving a second UPH filtering value and said measurement identifier with a second value for said second uplink carrier from said radio access node.

10. The method as recited in claim 9 wherein receiving said second UPH filtering value and said measurement identifier with said second value is part of a radio link parameter update indication (RL PUI) from said radio access node.

11. The method as recited in claim 9 further comprising determining a transmission time interval switching configuration as a function of said first UPH filtering value and said second UPH filtering value.

12. The method as recited in claim 9 further comprising determining a transmission time interval switching configuration as a function of said first UPH filtering value.

13. The method as recited in claim 9 further comprising receiving a proposed target transmission time interval switching configuration as a function of said first UPH filtering value from said radio access node.

14. The method as recited in claim 13 further comprising determining a transmission time interval switching configuration as a function of said proposed target transmission time interval switching configuration.

15. An apparatus operable in a communication system having a first uplink carrier and a second uplink carrier, comprising processing circuitry configured to:
   receive a first user equipment power headroom (UPH) filtering value and a measurement identifier with a first value for said first uplink carrier from a radio access node; and
   receive a second UPH filtering value and said measurement identifier with a second value for said second uplink carrier from said radio access node.

16. The apparatus as recited in claim 15 wherein said processing circuitry is configured to receive said second UPH filtering value and said measurement identifier with said second value as part of a radio link parameter update indication (RL PUI) from said radio access node.

17. The apparatus as recited in claim 15 wherein said processing circuitry is configured to determine a transmission time interval switching configuration as a function of said first UPH filtering value and said second UPH filtering value.

18. The apparatus as recited in claim 15 wherein said processing circuitry is configured to determine a transmission time interval switching configuration as a function of said first UPH filtering value.

19. The apparatus as recited in claim 15 wherein said processing circuitry is configured to receive a proposed target transmission time interval switching configuration as a function of said first UPH filtering value from said radio access node.

20. The apparatus as recited in claim 19 wherein said processing circuitry is configured to determine a transmission time interval switching configuration as a function of said proposed target transmission time interval switching configuration.

* * * * *